July 9, 1957     G. L. STECK     2,798,405
THREADLESS NUT WITH RESILIENTLY CONNECTED BASE PORTIONS
Filed Oct. 16, 1952
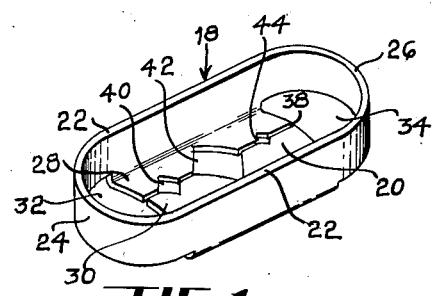
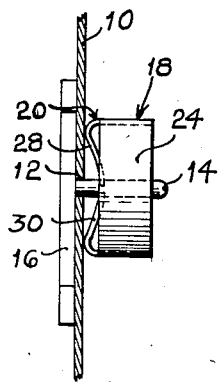
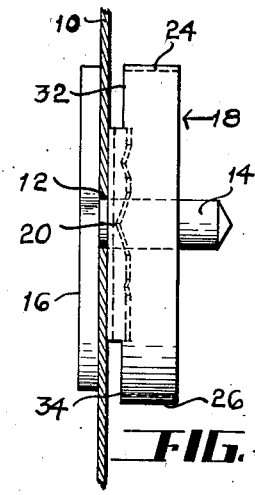
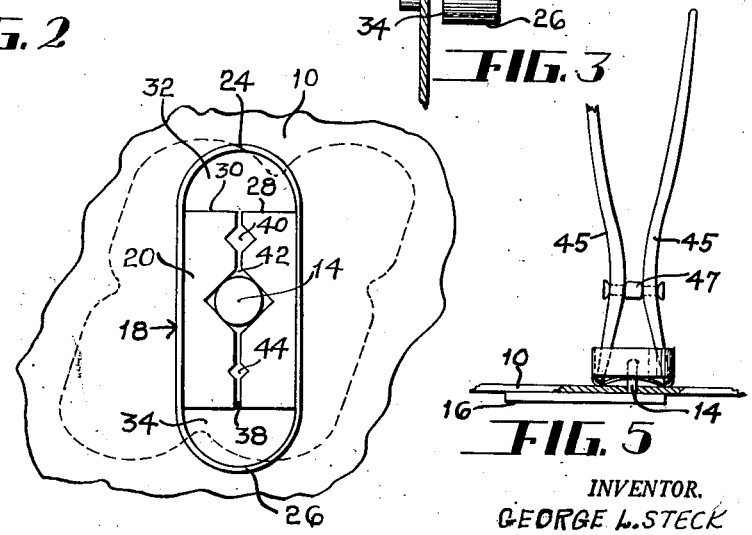
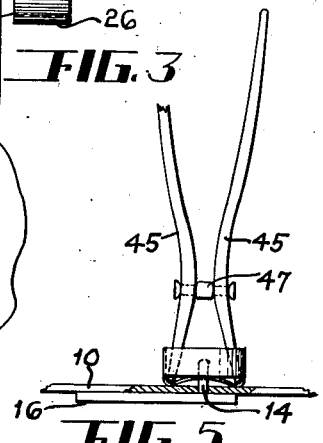
INVENTOR.
GEORGE L. STECK
BY
HIS ATTORNEY United States Patent Office 2,798,405
Patented July 9, 1957

2,798,405

THREADLESS NUT WITH RESILIENTLY CONNECTED BASE PORTIONS

George L. Steck, Dayton, Ohio

Application October 16, 1952, Serial No. 315,058

2 Claims. (Cl. 85—36)

This invention relates to a fastening device and in particular to a clamping type nut similar to a speed nut.

In repairing bodies of automobiles, the garage repairmen oftentimes find it necessary to replace name plates and trade names on the body of the automobile, for example, the trade names "Dynaflow," "88," "Hydramatic," "Fleetwood," etc. These plates are generally made of a casting having an integral stud thereon which projects through an opening in the body and is held in place by a clamp. Quite often the clamp that holds the name plate in place becomes damaged and must be replaced. Since the studs or pins are of various sizes, it is sometimes difficult to have the correct size of clamp on hand. It necessitates stocking a large number of various size clamps. It is, therefore, an object of this invention to provide a novel clamp that may be used when the original clamp has become damaged and which has a plurality of openings of various sizes to fit various size studs or pins, in other words, a universal clamp.

It is another object of this invention to provide a clamp for use in holding a name plate on an automobile, or the like, in place, and which has novel locking means for frictional engagement with the pin of the name plate.

It is a further object of this invention to provide a clamp having a base with a flange thereon. The base has cutout portions at each end and a longitudinally extending slot therethrough. This slot divides the base into similar opposing tongues. One tongue is further provided with various size V-notches in alignment with various size V-notches in the other tongue to form passageways for receiving studs or the like. The base is further concavely shaped in a transverse direction of the clamp. The minimum diameter of the passageways is slightly smaller than the diameter of the studs or pins. This construction of the base permits a sufficient amount of friction to exist to lock the stud in position.

Other objects and advantages reside in the construction of parts, the combination thereof and the mode of operation, as will become more apparent from the following description.

Referring to the drawings,

Figure 1 is a perspective view of the clamp.

Figure 2 is an end view of the clamp showing the arch shape thereof.

Figure 3 is a side elevational view of the clamp showing the length and curvature of the tongues.

Figure 4 is a plan view showing the complementary notches in opposing relationship to form openings for receiving pins.

Fig. 5 is an end elevational view of a clamp and tongs for removing the clamp.

In the drawings, reference numeral 10 generally designates a sheet metal body provided with an aperture 12 for receiving a stud 14, or the like, which is integral with a name plate 16. A clamp 18 secures the stud and name plate in place. The clamp has a base 20 having a longitudinally elongate flange 22 with rounded ends 24 and 26 thereon. The clamp can be made from a single stamping or from identical halves and welded at the ends of the flange to form a single unit. The flange 22 lends strength and rigidity to the clamp.

The base 20 is comprised of transversely extending tongues 28 and 30 in opposing relation. The base is further cut out at 32 and 34, so as to give the tongues more of a springing action to frictionally engage the stud 14. The tongues have an arch shape, the arch extending in a transverse direction of the clamp. The tongues terminate in spaced relation to each other to form a slot 38 extending longitudinally of the clamp and the full length of the base.

Various size complementary V-notches are disposed in the edges of the tongues to cooperate to form a plurality of various size openings 40, 42 and 44. The openings have a diameter slightly smaller than the studs to be received therein, so as to frictionally engage the pin or stud 14 which is integral with the name plate or casting 16.

When the name plate 16 becomes damaged and needs replacing, it is only necessary to insert the stud 14 through the aperture 12 in the body 10 and place the clamp 18 on the stud to lock it in place. Due to the arch shape of the base, the tongues 28 and 30, and the diameters of the passageways being smaller than the stud 14, a springing action results when the clamp is placed on the stud, so that the margins of the notches will embed themselves in the stud 14 to frictionally engage therewith, so as to prevent removal thereof. Since the studs 14 are of various sizes, the various size passageways enable the user to slip the clamp on the stud which fits the particular size passageway. This eliminates the necessity of stocking many sizes of clamps.

As a result of this invention, a novel clamp for securing studs in place is provided. This clamp does not require expensive processes for its fabrication. Therefore, it can be produced cheaply and easily. Furthermore, stocking of a large number of various size clamps becomes unnecessary in view of the various size openings in the clamp.

The clamp disclosed herein is of particular value to the serviceman and the small manufacturer, especially a small manufacturer who manufactures items requiring different sizes of clamps. For example, the speed nut or clamp may be used by auto mechanics, radio servicemen, television servicemen, repair shops repairing household appliances, toy manufacturers, and numerous other places where a clamp may be used for engaging a pin or a stud instead of the use of a threaded bolt and a nut therefor.

In Figure 5 a pair of tongs 45 held in spaced relation by a spacer 47 has been illustrated for separating the tongs to facilitate removal and installation in the event repairs are required.

The clamping device herein described may be subjected to a suitable heat treatment, so as to provide the necessary resiliency, in other words, to temper the material or case harden the material, as the case may be.

In the conventional speed nuts or clamps used in industry, if it is found necessary to remove the name plate or whatever the part is that is secured in position by the clamp, the removal of the clamps results either in a breaking of the stud or a failure of the clamp or bolt. By use of a removable clamp, by merely spreading the tongues containing the opposed notches, it is possible to service parts by releasing the tongues without breaking the studs or pins and without ruining the clamp. Furthermore, by using the resilient mounting for the tongues, the range of pins that may be clamped into position by a particular clamp is greatly increased, in that if the stud is too large for one opening and too small for the succeeding opening, it is merely necessary to spread the tongues slightly so as to permit the use of a small opening and then release the pressure used in spreading the tongues so as to firmly engage the sides of the tongues.

Furthermore, this type of clamp, where the tongues may be spread apart, facilitates the use of the clamp in crowded installations where a very small amount of space is available for the clamp. By spreading the jaws or tongues of the clamps, the clamp may readily be inserted and then by releasing the force used in spreading the clamp, the clamp will readily engage the pin or stud in position.

It is apparent that the specific embodiment shown above has been given by way of illustration and not by way of limitation. For example, the slot between the tongues could be V-shaped with a plurality of serrations or oppositely disposed notches. Then by exerting spreading force upon the flanges 22 and while spread inserting the clamp upon the pin to be secured in position until the proper serrations engage the pin, the clamp will rigidly secure the pin in position upon the flanges being released.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a sheet metal device, a cup-shaped member comprising a peripheral flange having a pair of straight portions extending parallel to each other, the straight portions being joined by semi-circular portions and a base portion extending partially the length of the flange, said flange extending substantially normal to said base portion, said base portion comprising transverse halves opposing each other, said transverse halves cooperating to form a convex base for the cup-shaped member, one half being connected to each said straight portion of the flange, one half being provided with various size notches in opposing relation with various size notches in the other half to form a plurality of various size passageways for receiving various size pieces, the semi-circular portions of the peripheral flange providing a pair of resilient bonds between the two halves of the base.

2. In a sheet metal device, a cup-shaped member comprising a peripheral flange having a pair of straight portions extending parallel to each other, the straight portions being joined by semi-circular portions, and a base portion extending partially the length of the flange, said flange extending substantially normal to said base portion, said base portion comprising transverse halves opposing each other, said transverse halves cooperating to form a convex base for the cup-shaped member, one half being connected to each said straight portion of the flange, one half being provided with a notch in opposing relation with a complementary notch in the other half to form a passageway for receiving a pin, the semi-circular portion of the peripheral flange providing a pair of resilient bonds between the two halves of the base.

References Cited in the file of this patent

UNITED STATES PATENTS

| | | |
|---|---|---|
| 1,768,720 | Taylor | July 7, 1930 |
| 1,793,127 | Osius | Feb. 17, 1931 |
| 2,064,092 | Tinnerman | Dec. 15, 1936 |
| 2,191,780 | Tinnerman | Feb. 27, 1940 |
| 2,285,273 | Hall et al. | June 2, 1942 |
| 2,339,664 | Tinnerman | Jan. 18, 1944 |
| 2,378,850 | Hyre | June 19, 1945 |
| 2,443,614 | Gray | June 22, 1948 |